US010892857B2

(12) United States Patent
Ohlsson et al.

(10) Patent No.: US 10,892,857 B2
(45) Date of Patent: Jan. 12, 2021

(54) HARQ TRANSMISSION OF TRANSPORT BLOCKS (71) Applicant: Telefonaktiebolaget LM Ericsson (publ), Stockholm (SE)

(72) Inventors: Anders Ohlsson, Järfälla (SE); Christer Gustafsson, Huddinge (SE); Maria Höglund, Danderyd (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 273 days.

(21) Appl. No.: 16/067,874

(22) PCT Filed: Jan. 14, 2016

(86) PCT No.: PCT/SE2016/050015
§ 371 (c)(1),
(2) Date: Jul. 3, 2018

(87) PCT Pub. No.: WO2017/123126
PCT Pub. Date: Jul. 20, 2017

(65) Prior Publication Data
US 2020/0266935 A1    Aug. 20, 2020

(51) Int. Cl.
*H04L 1/18* (2006.01)
*H04L 1/08* (2006.01)
*H04W 76/28* (2018.01)

(52) U.S. Cl.
CPC ............. *H04L 1/1819* (2013.01); *H04L 1/08* (2013.01); *H04L 1/1822* (2013.01); *H04W 76/28* (2018.02)

(58) Field of Classification Search
CPC ...... H04L 1/00; H04L 1/08; H04L 1/18; H04L 1/189; H04L 1/1816; H04L 1/1819;
(Continued)

(56) References Cited

U.S. PATENT DOCUMENTS 7,471,693 B2 *  12/2008  Petrovic ............... H04L 1/0083
                                                    370/322
7,961,680 B2 *   6/2011  Park ..................... H04W 74/006
                                                    370/329
(Continued)

FOREIGN PATENT DOCUMENTS

EP      1 389 848 A1    2/2004
WO   2015 042431 A1    3/2015

OTHER PUBLICATIONS

Title: Process ID Allocation for Downlink Persistent Scheduling; Source: CATT; Agenda Item: 5.1.1.8 (R2-080719)—2008.
(Continued)

*Primary Examiner* — Tri H Phan
(74) *Attorney, Agent, or Firm* — Baker Botts, LLP (57) ABSTRACT

There is provided mechanisms for hybrid automatic repeat request (HARQ) transmission of a transport block from a network node to a wireless device. A method is performed by the network node. The method comprises detecting a HARQ failure upon having transmitted the transport block to the wireless device, wherein the transport block has been transmitted using a HARQ process. The method comprises transmitting data of the transport block to the wireless device using two mutually different HARQ processes as a result of having detected the HARQ failure. There is also provided a network node configured to perform such a method.

17 Claims, 4 Drawing Sheets

(58) Field of Classification Search
CPC ... H04L 1/1822; H04L 1/1858; H04L 1/1864; H04L 1/1896; H04W 76/28
See application file for complete search history.

(56) References Cited

U.S. PATENT DOCUMENTS

| | | | | |
|---|---|---|---|---|
| 8,239,721 | B2* | 8/2012 | Pelletier | H04L 1/1812 714/749 |
| 10,171,276 | B2* | 1/2019 | Stern-Berkowitz | H04W 72/1215 |
| 10,462,769 | B2* | 10/2019 | Lee | H04W 72/14 |
| 10,492,174 | B2* | 11/2019 | Lee | H04W 72/0413 |
| 10,727,982 | B2* | 7/2020 | Webb | H04L 1/1812 |
| 2011/0141952 | A1 | 6/2011 | Wang et al. | |
| 2013/0301420 | A1 | 11/2013 | Zhang et al. | |
| 2015/0085796 | A1* | 3/2015 | Xu | H04W 72/0493 370/329 |
| 2016/0234820 | A1* | 8/2016 | Mallik | H04W 72/0406 |
| 2017/0230149 | A1* | 8/2017 | Wang | H04L 1/1819 |

OTHER PUBLICATIONS

PCT International Search Report for International application No. PCT/SE2016/050015—dated Sep. 28, 2016.
PCT Written Opinion of the International Searching Authority for International application No. PCT/SE2016/050015—dated Sep. 28, 2016.

* cited by examiner

HARQ TRANSMISSION OF TRANSPORT BLOCKS

PRIORITY

This nonprovisional application is a U.S. National Stage Filing under 35 U.S.C. § 371 of International Patent Application Serial No. PCT/SE2016/05001.5 filed Jan. 14, 2016 and entitled "HARQ TRANSMISSION OF TRANSPORT BLOCKS" which is hereby incorporated by reference in its entirety.

TECHNICAL FIELD

Embodiments presented herein relate to hybrid automatic repeat request, (HARQ) transmission, and particularly to a method, a network node, a computer program, and a computer program product for HARQ transmission of a transport block from a network node to a wireless device.

BACKGROUND

In communications networks, According to some aspects there are a challenge to obtain good performance and capacity for a given communications protocol, its parameters and the physical environment in which the communications network is deployed.

For example, Hybrid Automatic Repeat Request (HARQ) is a mechanism used in communications systems, such as Long Term Evolution (LTE), to handle retransmission of missing or erroneous transmitted packets. The HARQ procedure consists in providing quick feedbacks Acknowledgement/Negative-Acknowledgement (ACK/NACK) to the transmitter for each transport block (e.g., a medium access control (MAC) packet data unit (PDU)) according to the output of the decoding procedure applied at the receiver (e.g., Cyclic Redundancy Check, CRC). In order to increase the probability of successfully decoding of a transport block, HARQ is enforced by a so-called soft combining technique. In LTE, a special soft combining method is used, so-called incremental redundancy, consisting of temporarily storing at the receiver side the erroneously received packet and combining it with the retransmitted replicas of that packet as requested by the HARQ feedback. Such replicas contain the same data as the original transport block but with different encoding thereby puncturing the encoder output in different ways according to a certain scheme of redundancy versions that depend on the specific retransmission attempt.

In legacy LTE, the uplink HARQ feedbacks (ACK/NACK) are conveyed by the Physical Hybrid-ARQ Indicator Channel (PHICH) channel that is transmitted by the network node (such as an evolved Node B, eNB) upon detection of an uplink transmission (i.e., from wireless device to network node) on the Physical Uplink Shared Channel (PUSCH) by the served wireless device (such as a User Equipment, UE). On the other hand, the downlink HARQ feedbacks (ACK/NACK) are conveyed by the Physical Uplink Control Channel (PUCCH) that is transmitted by the UE upon detection of a downlink transmission (i.e., transmission from network node to wireless device) on the Physical Downlink Shared Channel (PDSCH) by the network node.

If a transmission of a certain transport block fails in the downlink, the network node can trigger an asynchronous retransmission (i.e. postpone the retransmission occurrence for a certain amount of time) and/or an adaptive retransmission (i.e. change the physical resource block (PRB) allocation and/or the link adaptation format).

If the failed HARQ transmission is a failure on the Physical Downlink Control Channel (PDCCH),), the wireless device will not monitor the PDCCH, due to the use of a discontinuous reception (DRX) profile with a low drx-onDurationTimer value and a low drx-inactivityTimer value. This disables the benefits of soft combination on HARQ. All the HARQ retransmissions for this particular transport block will fail due to the wireless device not monitoring the PDCCH.

This means that the transmission will reach a HARQ failure and the soft buffers are cleared, i.e. the transport block is lost.

In cases the data of the transmissions relates to services, such as Internet browsing, video streaming, etc., that are performed using radio link control (RLC) Acknowledge Mode (and the Transmission Control Protocol, TCP) the RLC (or TCP) will eventually perform retransmissions which will increase the chance of a successful transmission. Delays introduced in the data flow can be handled by these services.

Consider instead real-time services such as conversational data services, with Voice over LTE (VoLTE) as one example, where no retransmissions are performed on RLC level. RLC Unacknowledged Mode is used to minimize the delays in the data transfer which means that these services are more vulnerable to failed HARQ transmissions caused by PDCCH failures. This may especially be the case where the wireless device is configured with a DRX profile with a low drx-inactivityTimer value and a low drx-onDurationTimer value.

Hence, there is still a need for an improved HARQ transmission of a transport block.

SUMMARY

An object of embodiments herein is to provide efficient HARQ transmission of a transport block.

According to a first aspect there is presented a method for hybrid automatic repeat request (HARQ) transmission of a transport block from a network node to a wireless device. The method is performed by the network node. The method comprises detecting a HARQ failure upon having transmitted the transport block to the wireless device, wherein the transport block has been transmitted using a HARQ process. The method comprises transmitting data of the transport block to the wireless device using two mutually different HARQ processes as a result of having detected the HARQ failure.

Advantageously this method (as well as the network nodes and computer program disclosed below) provides efficient handling of transmission failures of a transport block. In turn this enables efficient HARQ transmission of the transport block.

Advantageously this method (as well as the network nodes and computer program disclosed below) enables a scheduling mechanism to perform a more secure downlink transmission when using a HARQ process that previously encountered a HARQ failure.

Although this method (as well as the network nodes and computer program disclosed below) is particularly suitable to be used for conversational services where the service quality heavily relies on the success of downlink PDCCH transmissions, the method is suitable for transmission of any type of data where the service quality heavily relies on the success of downlink transmissions.

According to a second aspect there is presented a network node for HARQ transmission of a transport block from the network node to a wireless device. The network node comprises processing circuitry. The processing circuitry is configured to cause the network node to detect a HARQ failure upon having transmitted the transport block to the wireless device, wherein the transport block has been transmitted using a HARQ process. The processing circuitry is configured to cause the network node to transmit data of the transport block to the wireless device using two mutually different HARQ processes as a result of having detected the HARQ failure.

According to a third aspect there is presented a network node for HARQ transmission of a transport block from the network node to a wireless device. The network node comprises processing circuitry and a computer program product. The computer program product stores instructions that, when executed by the processing circuitry, causes the network node to detect a HARQ failure upon having transmitted the transport block to the wireless device, wherein the transport block has been transmitted using a HARQ process; and to transmit data of the transport block to the wireless device using two mutually different HARQ processes as a result of having detected the HARQ failure.

According to a fourth aspect there is presented a network node for HARQ transmission of a transport block from the network node to a wireless device. The network node comprises a first detect module configured to detect a HARQ failure upon having transmitted the transport block to the wireless device, wherein the transport block has been transmitted using a HARQ process. The network node comprises a first transmit module configured to transmit data of the transport block to the wireless device using two mutually different HARQ processes as a result of having detected the HARQ failure.

According to a fifth aspect there is presented a computer program for HARQ transmission of a transport block from a network node to a wireless device, the computer program comprising computer program code which, when run on a network node, causes the network node to perform a method according to the first aspect.

According to a sixth aspect there is presented a computer program product comprising a computer program according to the fifth aspect and a computer readable storage medium on which the computer program is stored.

It is to be noted that any feature of the first, second, third, fourth, fifth and sixth aspects may be applied to any other aspect, wherever appropriate. Likewise, any advantage of the first aspect may equally apply to the second, third, fourth, fifth and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
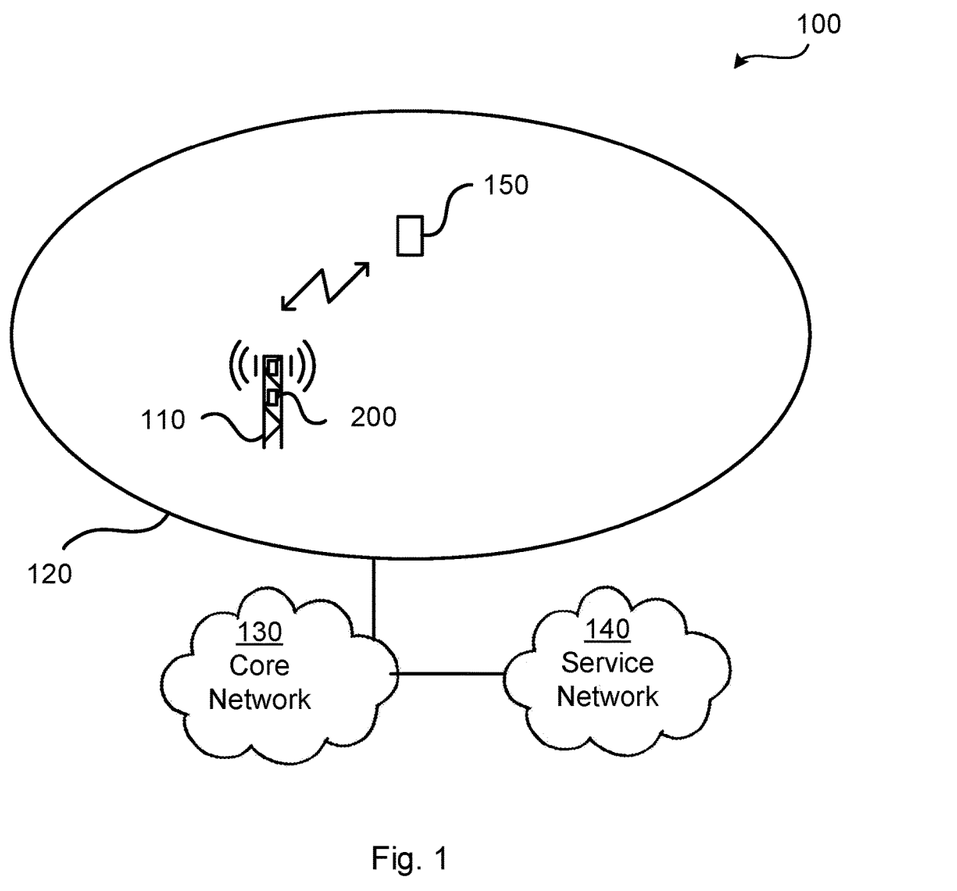
FIG. 1 is a schematic diagram illustrating a communication network according to embodiments.

FIG. 1 is a schematic diagram illustrating a communications network 100 where embodiments presented herein can be applied. The communications system 100 comprises a radio access network 120, a core network 130, and a service network 140. The radio access network 120 is operatively connected to the core network 130 which in turn is operatively connected to the service network 140.

The radio access network 120 comprises at least one radio access network node 110. The radio access network node 110 enables served wireless devices, one of which is identified at reference numeral 150, to access services and exchange data as provided by the service network 140.

The communications network 100 further comprises a network node 200. One network node 200 may be provided in, or installed on, the radio access network node 110. Briefly, the network node 200 controls the operation of the radio access network node 110. Further functionality of the network device 200 will be provided below.

Examples of wireless devices 150 include, but are not limited to, mobile stations, mobile phones, handsets, wireless local loop phones, user equipment (UE), smartphones, laptop computers, and tablet computers.

Examples of radio access network nodes 110 include, but are not limited to, radio base stations, base transceiver stations, Node Bs, evolved Node Bs, and access points (APs).

As the skilled person understands, the communications system 100 may comprise a plurality of radio access network nodes 110, each providing network access to a plurality of wireless devices 150. The herein disclosed embodiments are not limited to any particular number of radio access network nodes 110 or wireless devices 150.

Transmission of packet data traffic between the radio access network node 110 (as controlled by the network node 200) and the wireless device 150 can be bursty. Given the bursty nature of this packet data traffic, it could be desirable that the wireless device 150 switches off its receiver circuitry at some predefined intervals to limit the battery consumption of the wireless device 150. In LTE this behavior is accomplished by the DRX mechanism. When DRX is active, the wireless device 150 periodically listens for downlink control signaling (i.e. grants for uplink transmissions or downlink scheduling assignment on PDCCH) following a configurable DRX cycle (i.e., a short or long DRX cycle) for a certain number of consecutive subframes according to a configurable onDurationTimer value. During the rest of the time, the wireless device 150 is in a sleep mode where at least its receiver circuitry is switched off. The onDurationTimer value can be temporarily prolonged by a certain configurable drx-InactivityTimer value if a PDCCH is received before the onDurationTimer expires. Regardless of the DRX cycle, if HARQ transmission or retransmissions are still pending when the wireless device 150 is supposed to be in the sleep mode, the receiver circuitry remains switched on to listen to downlink assignments, and similarly in the uplink the receiver circuitry is switched on at the Transmission Time Interval (TTI) in which an HARQ feedback from the radio access network node 110 is expected to be sent on the PHICH.

Besides ACK/NACK, the HARQ mechanism can also be affected by discontinuous transmission (DTX) events. As DTX are typically treated those events in which the radio access network node 110 (or the wireless device 150) was expecting some transmission from the wireless device 150 (or the radio access network node 110), e.g. data transmission, HARQ feedbacks, on a given TTI, but no signal was detected over the air. Different reasons might trigger DTX events.

For instance for the data transfer on the downlink shared channel the DTX in the HARQ feedback from the wireless device 150 can be due to the fact that either the wireless device 150 missed the detection of the PDCCH for the downlink assignment or data was received but the radio access network node 110 could not detect the HARQ feedback on the PUCCH. Since the radio access network node 110 is not aware of the actual reason of DTX, it has to retransmit the packet also in cases where the wireless device 150 could decode that packet and send an ACK for it.

On the other hand, in the uplink the DTX detection in the radio access network node 110 can be due to the fact that either the wireless device 150 missed detecting the PDCCH indicating data or it was received by the wireless device 150 but the radio access network node 110 could not detect the transmission on PUCCH or PUSCH. As long as radio access network node 110 fails to distinguish the actual reason of DTX, it has to perform retransmission.

In some communications networks, such as LTE networks, all packets are delivered using the Internet protocol (IP). This means that also traditionally circuit switched services such as conversational voice will make use of fast scheduling and will be provided using Voice over IP (VoIP). In a typical VoIP arrangement a voice encoder on the transmitter side encodes the speech into packets with the typical speech duration of 20 ms, mandated by GSMA IR.92.

VoLTE thereby enables communications networks such as LTE networks to provide voice services. The mouth-to-ear delay introduced by the transport scheduling and transmission of the VoLTE packets is one factor determining the experienced speech quality. This causes a relatively tight delay budget for VoLTE to ensure good speech quality. The normal delay budget in the radio access network node 110 is 80 ms. Up to the limit of the delay budget the speech quality is good. This means that it in general is sufficient to schedule a VoLTE service once every 40 ms and bundle two packets. Such a scheduling mechanism allows for a good balance between efficient usages of resources, good speech quality and enhanced battery performance.

When DRX is combined with VoLTE the wireless device 150 is configured to monitor the PDCCH during one or more subframes with a 40 ms period. Since speech packets are produced once every 20 ms this DRX configuration allows for transmission of two speech packets every 40 ms. One advantage of this configuration is that two packets are scheduled per scheduling opportunity, allowing efficient use of PDCCH and other scheduling resources, while the scheduling delay is still less than the delay budget. However, the tight delay budget of VoLTE does require that the wake period is utilized for scheduling of the VoIP packets that are available. If the opportunity is missed, an additional delay of 40 ms is reducing the possibility to transmit the packets within the packet delay budget.

The VoLTE service is not only vulnerable to delays but also to packets loss. The delays can be handled fairly well by the jitter-buffer in the wireless device 150, while packet loss, especially of consecutive packets, is something that generally decreases the VoLTE quality, both the perceived quality and the objective seen by lower scores on the Mean Opinion Score (MOS) measurements using POLQA (Perceptual Objective Listening Quality Assessment). I general terms, POLQA covers a model to predict speech quality by means of digital speech signal analysis. The predictions of those objective measures should come as close as possible to subjective quality scores as obtained in subjective listening tests.

Figure 6:
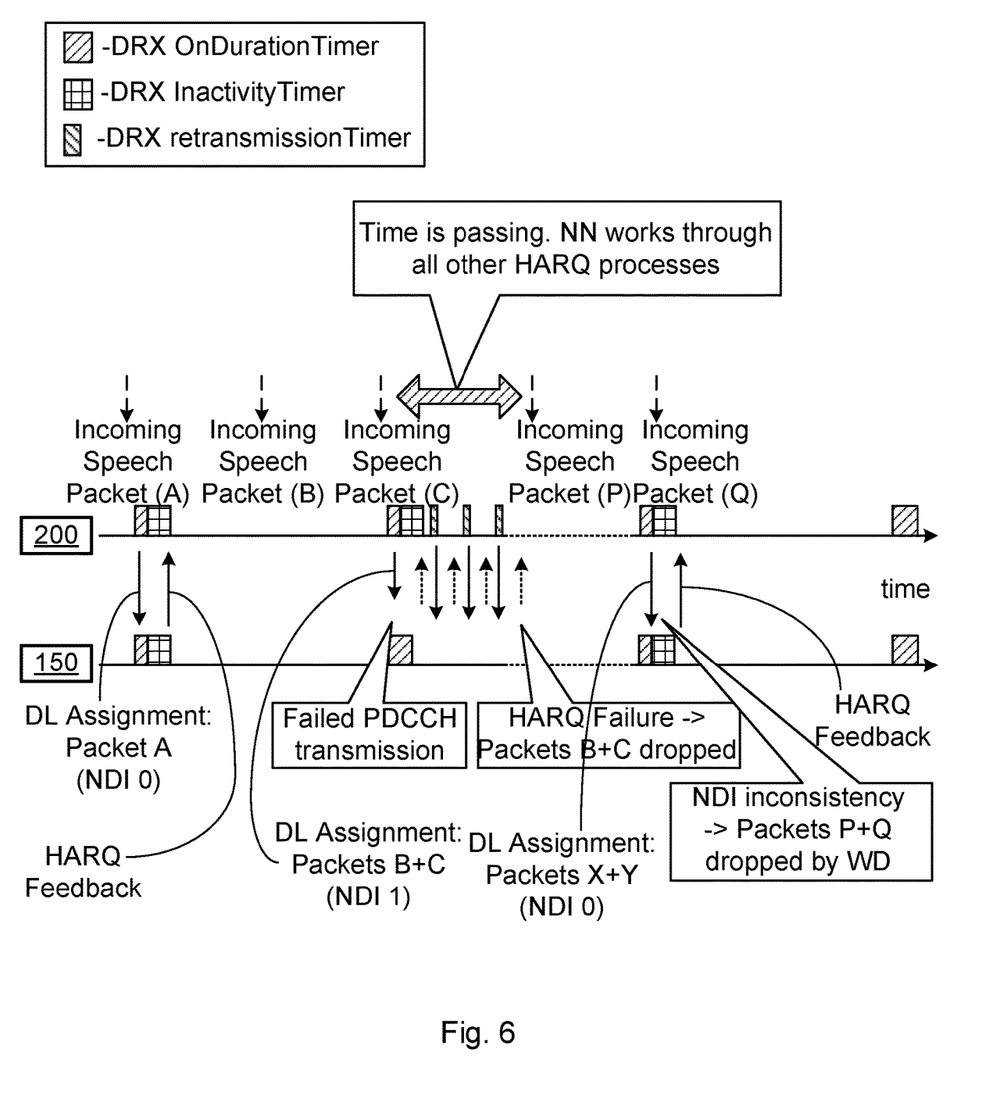
FIGS. 6 and 7 schematically illustrate scenarios of HARQ failure according to embodiments.

Consider the illustrative example of FIG. 6 representing a scenario of HARQ failure on the transmission channel (as exemplified by the PDCCH) during downlink transmission from a network node (NN) 200 to a wireless device (WD) 150.

In this scenario there is a wireless device 150 with an active VoLTE call (QCI1 bearer established). The wireless device 150 has been configured with DRX and a scheduling algorithm that bundles voice packets two-and-two in order to improve cell traffic capacity. A DRX setting has been chosen to optimize for battery performance in the wireless device 150, meaning a low drx-inactivityTimer value and a low drx-onDurationTimer value, which will make the network node 200 schedule the wireless device 150 every 40 ms with two voice packets, both in uplink and downlink.

The wireless device 150 is assumed to, for a short time, be located in an area where the PDCCH is interfered.

When the network node 200 sends the downlink transmission (on HARQ process Id 1, NDI=1) the wireless device 150 is not able to detect the PDCCH assignment, thus resulting in a failed PDCCH transmission as indicated in FIG. 6.

The network node 200 will detect that it does not receive any HARQ feedback on the downlink transmission from the wireless device 150 and will chose to perform an adaptive retransmission at the next retransmission occasion given by the DRX retransmissionTimer value.

In the illustrated scenario the wireless device 150 will be in DRX at that time and all HARQ retransmission attempts will fail resulting in the loss of the transport block, as illustrated by the indication HARQ failure→packets B+C dropped in FIG. 6. A loss of two voice packets A and B (two packets is because of the packet bundling) is thus caused.

It is assumed that time is passing during which the network node 200 works through all other HARQ processes, as indicated in FIG. 6.

The next time the network node 200 uses the same HARQ Process Id 1 (after have used all the other 7 HARQ processes successfully), the network node 200 will toggle the NDI bit (NDI=0) to indicate a new data transmission.

At this time the downlink assignment transmission on the PDCCH is assumed to be successful. The wireless device 150 receiving the data will observe the NDI bit and conclude that this transmission is a retransmission on the previous downlink transmission, because the wireless device 150 never received the DL transmission with NDI=1 (because of the failed PDCCH transmission described above).

The wireless device 150 will therefore send a HARQ acknowledgement of this transmission, making the network node 200 believe the transmission is successful. Further, the wireless device 150 will discard the data it received, which causes an additional loss of two voice packets, as indicated by NDI inconsistency→packets P+Q dropped by WD in FIG. 6.

With just one single failed PDCCH transmission the wireless device 150 thus lost four voice packets in a relative short period of time. This has a noticeable impact on the perceived VoLTE service performance when measuring the voice quality and gives lower scores using POLQA.

The embodiments disclosed herein therefore relate to HARQ transmission of a transport block from a network node 200 to a wireless device 150. In order to obtain such HARQ transmission there is provided a network node 200, a method performed by the network node 200, a computer program product comprising code, for example in the form of a computer program, that when run on a network node 200, causes the network node 200 to perform the method.

Figure 4:
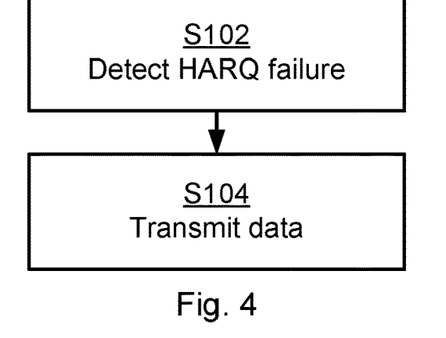
FIGS. 4 and 5 are flowcharts of methods according to embodiments.
Figure 5:
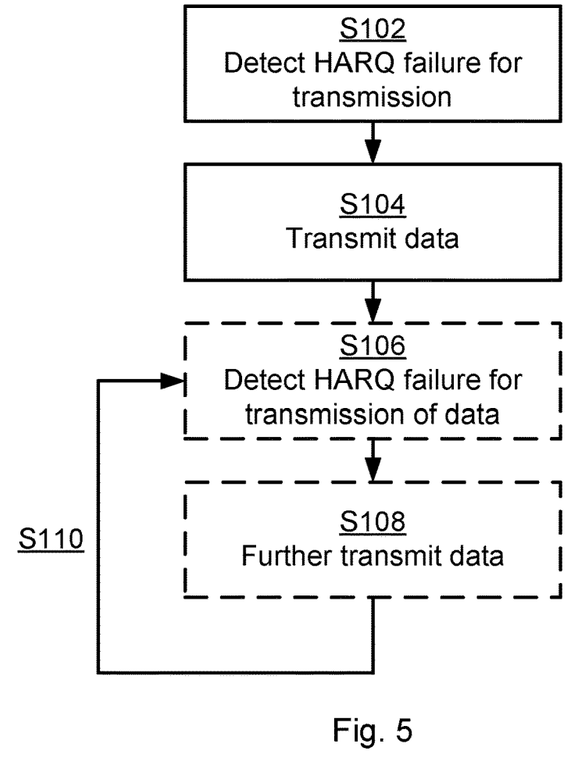

FIGS. 4 and 5 are flow chart illustrating embodiments of methods for HARQ transmission of a transport block from a network node 200 to a wireless device 150. The methods are performed by the network node 200. The methods are advantageously provided as computer programs 320.

Reference is now made to FIG. 4 illustrating a method for HARQ transmission of a transport block from a network node 200 to a wireless device 150 as performed by the network node 200 according to an embodiment.

It is assumed that a HARQ failure occurs upon the network node 200 having transmitted a transport block to the wireless device 150. The network node 200 is therefore configured to, in a step S102, detect a HARQ failure upon having transmitted the transport block to the wireless device. It is assumed that the transport block has been transmitted using a HARQ process.

Due to reasons explained above, in response to having detected the HARQ failure the network node 200 does not simply start a transmission using the same HARQ process for transmitting the data of the transport block for which HARQ failure has been detected in step S102 to the wireless device 150. This could lead to issues illustrated in connection with FIG. 6 (for example the transport block being dropped by the wireless device 150 if sent by the same HARQ process that previously had the HARQ failure). Instead, the network node 200 is configured to, in a step S104, transmit data of the transport block to the wireless device 150 using two mutually different HARQ processes as a result of having detected the HARQ failure.

The step of transmitting the data to the wireless device 150 using two mutually different HARQ processes increases the robustness of the transmission from the network node 200 to the wireless device 150. By introducing such a mechanism to be performed directly after a HARQ failure on a specific HARQ process this method enforces the traditional HARQ mechanism described above.

Embodiments relating to further details of HARQ transmission of a transport block from a network node 200 to a wireless device 150 as performed by the network node 200 will now be disclosed. These embodiments are readily combinable as see fit by the skilled person.

According to an embodiment, one of the two mutually different HARQ processes is identical to the HARQ process of the HARQ failure.

Further, each one of the two mutually HARQ processes can have a new data indicator (NDI) value. According to an embodiment the step S204 of transmitting the data to the wireless device 150 using the two mutually different HARQ processes comprises toggling the NDI values in each of the two mutually HARQ processes. This introduces a way of resetting the NDI bit after a HARQ failure, thereby minimizing the risk of NDI bit inconsistency. Transport blocks being dropped by the wireless device 150 due to the NDI bit inconsistency where the wireless device 150 interprets a new HARQ transmission as a retransmission is thereby avoided.

According to some aspects there are different ways to determine when and/or how the data is to be transmitted. Different embodiments relating thereto will now be described in turn.

As to when the data is to be transmitted, according to an embodiment the data is transmitted (in step S104) in a first available reoccurring instant of the HARQ process of the HARQ failure after the HARQ failure has been detected (in step S102). Further, the data can be transmitted to the wireless device 150 during a DRX retransmission period of the wireless device 150.

As to how the so-called data block is to be transmitted, according to an embodiment the data is transmitted on a physical downlink shared channel (PDSCH).

According to some aspects there are different ways to detect the HARQ failure as in step S102. For example, the HARQ failure can be detected by absence of HARQ feedback from the wireless device 150. Hence, the network node 200 can determine a HARQ failure of a transmission of a transport block destined to the wireless device 150 if the network node 200 fails to receive any feedback from the wireless device 150. In order to receive such feedback, and thus to detect HARQ failure, the network node 200 therefore, according to some embodiments monitors a physical uplink control channel (PUCCH) for any HARQ feedback from the wireless device 150.

According to some aspects there are different examples of content of the transport blocks. For example, the data may comprise conversational data.

More particularly, the data can comprise payload data of a conversational service of the wireless device 150. Further, the so-called data may comprise at least two packets of payload data. Each packet of the two packets may comprise encoded speech. Hence, each packet may be a VoLTE packet.

According to one embodiment the data comprises data of the transport block for which HARQ failure is detected. According to one embodiment the data comprises further data than the data of the transport block for which HARQ failure is detected.

Reference is now made to FIG. 5 illustrating methods for HARQ transmission of a transport block from a network node 200 to a wireless device 150 as performed by the network node 200 according to further embodiments. It is assumed that steps S102 and S104 are performed as disclosed above.

It is envisioned that a HARQ failure also could occur for any of the two mutually different HARQ processes used for transmitting the data in step S104. Hence, according to an embodiment the network node 200 is configured to, in a step S106, detect a HARQ failure also for at least one of the two mutually different HARQ processes used for transmitting the data. Embodiments relating to how the HARQ failure can be detected have been provided above and also apply here. The network node 200 is then configured to, in a step S108, further transmit the data to the wireless device 150 using two mutually different HARQ processes. Embodiments relating to when and/or how to transmit the data have been provided above and also apply here.

Steps S106 and S108 may be entered again in case further HARQ failures, as indicated by step S110 in FIG. 5, occur.

Figure 7:
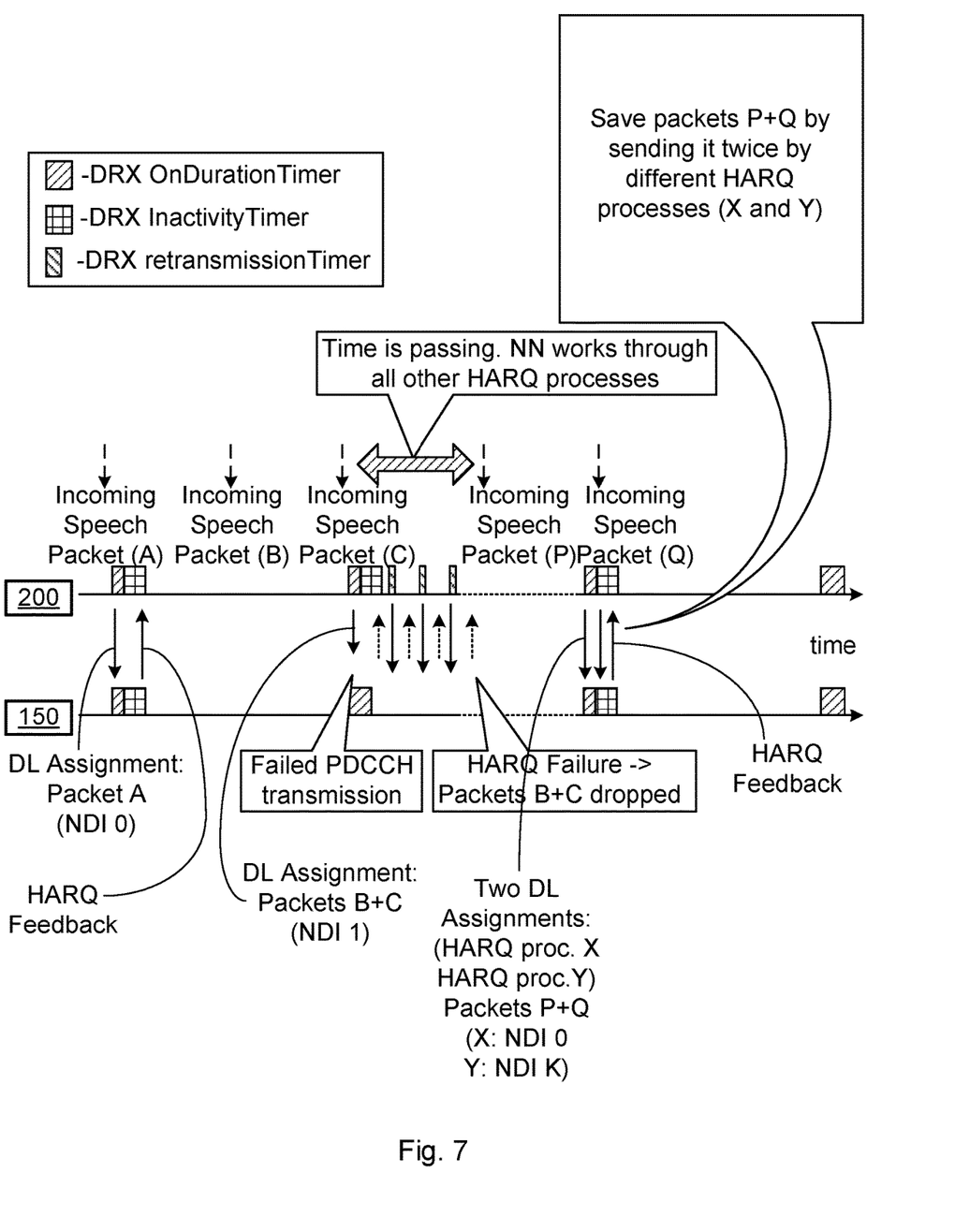

One particular embodiment for HARQ transmission of a transport block from the network node 200 to the wireless device 150 based on at least some of the above disclosed embodiments will now be disclosed with reference to FIG. 7.

FIG. 7 represents a scenario of HARQ failure on the transmission channel (as exemplified by the PDCCH) during downlink transmission from the network node (NN) 200 to the wireless device (WD) 150.

In this embodiment, the network node 200 detects DTX as HARQ feedback for data transfer on the DLSCH (PDSCH in LTE). The network node 200 then proceeds with HARQ retransmission at the DRX retransmission periods. In this scenario a failed PDCCH transmission is causing the DTX detection.

The illustrative example of FIG. 7 is similar to that of FIG. 6 but with the difference that the network node 200 performs steps S102 and S104 as defined above. In the illustrative example of FIG. 7 the network node 200 will thus use two HARQ processes (X and Y) to transfer the transport block (as in above step S104) at the first transmission available after detecting a HARQ failure for this particular HARQ process (as in above step S102). This procedure increases the chance of a successful transmission of the transport block.

In the illustrative example of FIG. 7, the first transmission of the data in step S104 using the same HARQ process (i.e., HARQ process X) with a toggled NDI bit (NDI=1 if NDI for transmission of packet A using HARQ process X was set to NDI=0) will succeed, but the data will be discarded by the wireless device 150 because the wireless device 150 regards this transmission as a retransmission of a previous transmission.

The second transmission of the same transport block, using a different HARQ process (i.e., HARQ process Y with NDI=K, where K represents the toggled value of the NDI for the most recent previous use of HARQ process Y), will succeed and the data will be acknowledged by the wireless device 150 and thus not discarded.

The herein disclosed mechanisms for handling HARQ failures will thus improve the downlink transmission success rate at HARQ failure scenarios caused, for example, by transmission failures occurring in PDCCH transmissions. The herein disclosed mechanisms for handling HARQ failures offers more secure downlink transmission than traditional mechanisms for handling HARQ failures at the cost of additional transmissions (PDCCH/PDSCH and HARQ feedback) and potentially several HARQ retransmissions. But if any of the herein disclosed mechanisms is applied to conservational services, such as VoLTE, and only is used after a HARQ failure, the gain of an improved VoLTE quality in the downlink exceeds the cost of the additional transmissions.

The herein disclosed mechanisms for handling HARQ failures are also applicable to a scenario where the PUCCH/PUSCH transmission is failing instead of the PDCCH transmission. In such a scenario both of the transmissions will succeed and one of the RLC PDUs will be discarded in the RLC layer, because the RLC will receive two PDUs with the same sequence number. In this scenario, the data transmission will, by means of the herein disclosed mechanisms for handling HARQ failures, still succeed at the cost of an extra HARQ transmission.

Figure 2A:
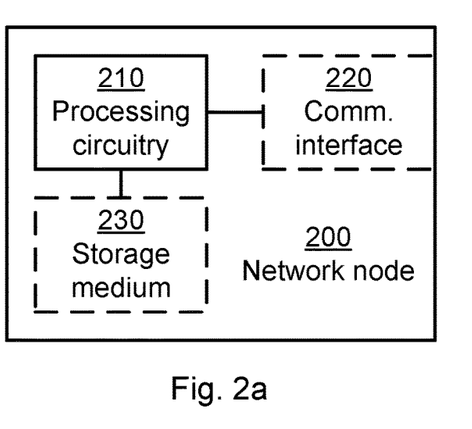
FIG. 2a is a schematic diagram showing functional units of a network node according to an embodiment.

FIG. 2a schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 310 (as in FIG. 3), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, S102-S110, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 for communications at least with a wireless device 150. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 2B:
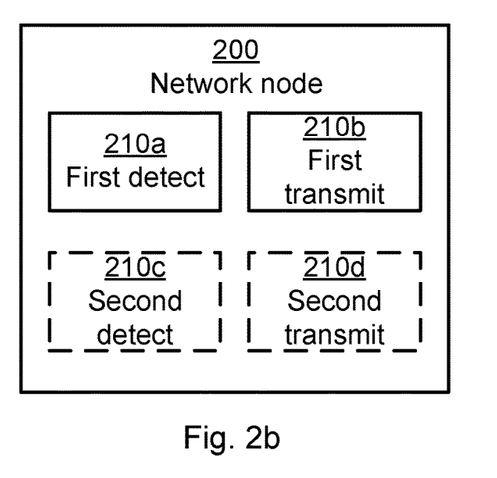
FIG. 2b is a schematic diagram showing functional modules of a network node according to an embodiment.

FIG. 2b schematically illustrates, in terms of a number of functional modules, the components of a network node 200 according to an embodiment. The network node 200 of FIG. 2b comprises a number of functional modules; a first detect module 210a configured to perform step S102, and a first transmit module 210b configured to perform step S104. The network node 200 of FIG. 2b may further comprises a number of optional functional modules, such as any of a second detect module 210c configured to perform step S106, and a second transmit module 210d configured to perform step S108. In general terms, each functional module 210a-210d may in one embodiment be implemented only in hardware or and in another embodiment with the help of software, i.e., the latter embodiment having computer program instructions stored on the storage medium 230 which when run on the processing circuitry makes the network node 200 perform the corresponding steps mentioned above in conjunction with FIG. 2b. It should also be mentioned that even though the modules correspond to parts of a computer program, they do not need to be separate modules therein, but the way in which they are implemented in software is dependent on the programming language used. Preferably, one or more or all functional modules 210a-210d may be implemented by the processing circuitry 210, possibly in cooperation with functional units 220 and/or 230. The processing circuitry 210 may thus be configured to from the storage medium 230 fetch instructions as provided by a functional module 210a-210d and to execute these instructions, thereby performing any steps as will be disclosed hereinafter.

The network node 200 may be provided as a standalone device or as a part of at least one further device. For example, the network node 200 may be provided in a radio access network node 110.

Figure 3:
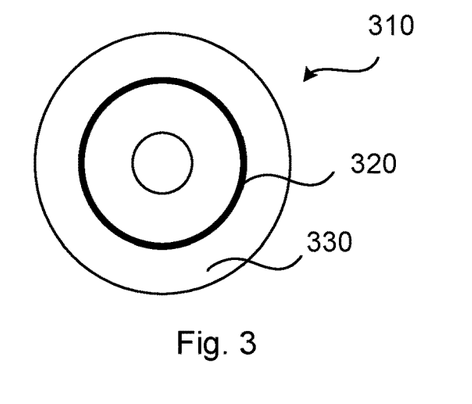
FIG. 3 shows one example of a computer program product comprising computer readable storage medium according to an embodiment.

FIG. 3 shows one example of a computer program product 310 comprising computer readable storage medium 330. On this computer readable storage medium 330, a computer program 320 can be stored, which computer program 320 can cause the processing circuitry 210 and thereto operatively coupled entities and devices, such as the communications interface 220 and the storage medium 230, to execute methods according to embodiments described herein. The computer program 320 and/or computer program product 310 may thus provide means for performing any steps as herein disclosed.

In the example of FIG. 3, the computer program product 310 is illustrated as an optical disc, such as a CD (compact disc) or a DVD (digital versatile disc) or a Blu-Ray disc. The computer program product 310 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 320 is here schematically shown as a track on the depicted optical disk, the computer program 320 can be stored in any way which is suitable for the computer program product 310.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, although having been disclosed in a time division duplex (TDD) context, the herein disclosed embodiments apply equally well in a frequency division (FDD) context. The handling of the HARQ timing differs between TDD and FDD. In FDD, HARQ feedbacks for a certain transport block are expected to be received 4 subframes after the transmission of a transport block. In TDD, given the different amount of uplink/downlink occasions within the radio frame, HARQ feedbacks for a certain transport block are supposed to be received at the subframe n+k, where n is the subframe of the corresponding transport block transmission and k≥4 is such that n+k is an uplink or downlink subframe depending on whether a given HARQ feedback has to be transmitted in uplink or downlink respectively.

The invention claimed is:

1. A method for hybrid automatic repeat request, HARQ, transmission of a transport block from a network node to a wireless device, the method being performed by the network node, the method comprising:

detecting a HARQ failure upon having transmitted the transport block to the wireless device, wherein the transport block has been transmitted using a HARQ process; and transmitting data of the transport block to the wireless device using two mutually different HARQ processes as a result of having detected the HARQ failure, and wherein each of the two mutually different HARQ processes has a new data indicator (NDI) value, and wherein transmitting said data to the wireless device using the two mutually different HARQ processes comprises toggling the NDI values.

2. The method according to claim 1, wherein one of the two mutually different HARQ processes is identical to the HARQ process of the HARQ failure.

3. The method according to claim 1, wherein said data is transmitted in a first available reoccurring instant of the HARQ process of the HARQ failure after the HARQ failure having been detected.

4. The method according to claim 1, wherein said data is transmitted to the wireless device during a discontinuous reception, DRX, retransmission period of the wireless device.

5. The method according to claim 1, wherein said data is transmitted on a physical downlink shared channel, PDSCH.

6. The method according to claim 1, wherein the HARQ failure is detected by absence of HARQ feedback from the wireless device.

7. The method according to claim 1, wherein the HARQ feedback is monitored on a physical uplink control channel, PUCCH.

8. The method according to claim 1, further comprising:
detecting a HARQ failure also for at least one of the two mutually different HARQ processes used for transmitting said data; and
further transmitting said data to the wireless device using two mutually different HARQ processes.

9. The method according to claim 1, wherein said data comprises payload data of a conversational service of the wireless device.

10. The method according to claim 1, wherein said data comprises at least two packets of payload data.

11. The method according to claim 1, wherein each packet of the two packets comprises encoded speech.

12. The method according to claim 1, wherein said data comprises data of said transport block for which HARQ failure is detected.

13. The method according to claim 1, wherein said data further comprises different data than data of said transport block for which HARQ failure is detected.

14. A network node for hybrid automatic repeat request, HARQ, transmission of a transport block from the network node to a wireless device, the network node comprising processing circuitry, the processing circuitry being configured to cause the network node to:

detect a HARQ failure upon having transmitted the transport block to the wireless device, wherein the transport block has been transmitted using a HARQ process; and transmit data of the transport block to the wireless device using two mutually different HARQ processes as a result of having detected the HARQ failure, and wherein each of the two mutually different HARQ processes has a new data indicator (NDI) value, and wherein transmitting said data to the wireless device using the two mutually different HARQ processes comprises toggling the NDI values.

15. A network node for hybrid automatic repeat request, HARQ, transmission of a transport block from the network node to a wireless device, the network node comprising:
  a first detect module configured to detect a HARQ failure upon having transmitted the transport block to the wireless device, wherein the transport block has been transmitted using a HARQ process; and
  a first transmit module configured to transmit data of the transport block to the wireless device using two mutually different HARQ processes as a result of having detected the HARQ failure, and
  wherein each of the two mutually different HARQ processes has a new data indicator (NDI) value, and
  wherein transmitting said data to the wireless device using the two mutually different HARQ processes comprises toggling the NDI values.

16. A network node for hybrid automatic repeat request, HARQ, transmission of a transport block from the network node to a wireless device, the network node comprising:
  processing circuitry; and
  a computer program product storing instructions that, when executed by the processing circuitry, causes the network node to:
    detect a HARQ failure upon having transmitted the transport block to the wireless device, wherein the transport block has been transmitted using a HARQ process; and
    transmit data of the transport block to the wireless device using two mutually different HARQ processes as a result of having detected the HARQ failure, and
  wherein each of the two mutually different HARQ processes has a new data indicator (NDI) value, and
  wherein transmitting said data to the wireless device using the two mutually different HARQ processes comprises toggling the NDI values.

17. A non-transitory computer readable storage medium for hybrid automatic repeat request, HARQ, transmission of a transport block from a network node to a wireless device, the non-transitory computer readable storage medium comprising computer code which, when run on processing circuitry of the network node, causes the network node to:
  detect a HARQ failure upon having transmitted the transport block to the wireless device, wherein the transport block has been transmitted using a HARQ process; and
  transmit data of the transport block to the wireless device using two mutually different HARQ processes as a result of having detected the HARQ failure, and
  wherein each of the two mutually different HARQ processes has a new data indicator (NDI) value, and
  wherein transmitting said data to the wireless device using the two mutually different HARQ processes comprises toggling the NDI values.

* * * * *